(12) United States Patent  
Armour

(10) Patent No.: US 7,660,906 B1  
(45) Date of Patent: Feb. 9, 2010

(54) DATA DELIVERY SYSTEM AND METHOD

(75) Inventor: Charles W. Armour, Pensacola, FL (US)

(73) Assignee: Beyond Media, LLC, Pensacola, FL (US)

( * ) Notice: Subject to any disclaimer, the term of this patent is extended or adjusted under 35 U.S.C. 154(b) by 279 days.

(21) Appl. No.: 11/728,747

(22) Filed: Mar. 27, 2007

Related U.S. Application Data

(60) Provisional application No. 60/786,342, filed on Mar. 27, 2006.

(51) Int. Cl.  
*G06F 15/16* (2006.01)

(52) U.S. Cl. ...................... 709/231; 709/236; 709/243; 709/244; 709/219

(58) Field of Classification Search .................. 709/219, 709/227, 231, 236, 243, 244, 248  
See application file for complete search history.

(56) References Cited

U.S. PATENT DOCUMENTS

| | | | | |
|---|---|---|---|---|
| 6,658,463 | B1* | 12/2003 | Dillon et al. ................. | 709/219 |
| 6,839,829 | B1* | 1/2005 | Daruwalla et al. .......... | 709/239 |
| 7,272,658 | B1* | 9/2007 | Edelman et al. ............. | 709/231 |
| 7,577,750 | B2* | 8/2009 | Shen et al. ................... | 709/231 |
| 2004/0143672 | A1* | 7/2004 | Padmanabham et al. .... | 709/231 |
| 2008/0244042 | A1* | 10/2008 | Jamin et al. ................. | 709/220 |

* cited by examiner

*Primary Examiner*—Ramy M Osman  
(74) *Attorney, Agent, or Firm*—J. Nevin Shaffer, Jr.

(57) ABSTRACT

A data delivery system and method of the present invention according to one embodiment includes establishing connections between computers regardless of NAT, transporting data between computers in a reliable fashion, creating a secure stream of packets from stored or streaming data on a server, organizing a plurality of computers to cooperatively transport secure packet streams, transporting and correcting secure packet streams in a cooperative environment, and rendering the original stored or streaming data from a secure packet stream thereby reducing demand on the server.

20 Claims, 8 Drawing Sheets

DATA DELIVERY SYSTEM AND METHOD

CROSS REFERENCE TO RELATED APPLICATION

This application claims the benefit of previously filed U.S. provisional patent application No. 60/786,342 filed Mar. 27, 2006 for a "Data Delivery System and Method". The Applicant hereby claims the benefit of this provisional application under 35 U.S.C. §119. The entire content of this provisional application is incorporated herein by this reference.

TECHNICAL FIELD

This invention relates to a data delivery system and method. In particular, this invention relates to a data delivery system and method for reliably distributing data to a number of networked systems while conserving the network resources at the source of the data.

BACKGROUND OF THE INVENTION

As regards the connection of computers, in many applications of the Internet, for example only and not by limitation, it has become apparent that traditional client-server models of data distribution are unsuitable for scaling to the massive demands intermittently experienced by servers, for example the "Slashdot" effect, where a server on the Internet is exposed to massive demand via its listing on a major public portal and fails to concurrently serve the overwhelming number of visitors.

This problem has given rise to "cooperative" networks, where the individual consumers of any data contribute the entirety of that data back to other users, thus saving the original source of the data from having to send it to all consumers. These applications have been proven to scale well on today's Internet, but these prior art "solutions" share several common caveats.

The prevalence of Network Address Translation (NAT) routers, which allow outgoing connections but deny incoming connections, offer a large measure of protection and convenience for the computers isolated behind them but they break many cooperative networking efforts. That is, since any consumer wishing to connect to a computer that sits behind a NAT router has no direct way of connecting to that computer, the presence of one or more NAT routers between two computers on the Internet can result in their inability to directly communicate.

Prior art solutions to this have involved the use of intermediary computers which are not behind a NAT router. Two computers wishing to communicate connect to this intermediary computer and use it as a message relay between them. This scenario, however, actually utilizes twice the overall bandwidth that direct communication would entail, and thus suffers from severe performance limitations.

Continuing by way of example only, most NAT routers provide functionality to forward certain ports to specific internal computers, but configuring is difficult to do and often outside the ability of a user. All prior art technologies of which Applicant is aware, such as UPnP, are overly complex and are rarely executed properly, such that currently the user is faced with a vast array of incompatible devices with dubious supportability.

Since the ability to directly communicate between nodes is beneficial to any distributed application and to some point to point applications, there is a need in the art for ways to deliver data between such points without an intermediary system as now required. Thus, a system and method for directly connecting two systems, each behind a respective NAT router or the like, is one objective of the present invention.

A related issue arises once two systems are effectively connected, even those systems located behind NAT routers, and that issue is how to deliver data in a manner that reduces the network load on the data source. Thus, a system and method for delivering streams of data to multiple users that reduces the source bandwidth required by prior art solutions is another objective of the present invention.

SUMMARY OF THE INVENTION

Accordingly, the data delivery system and method of the present invention according to one embodiment includes establishing connections between computers regardless of NAT, transporting data between computers in a reliable fashion, creating a secure stream of packets from stored or streaming data, organizing a plurality of computers to cooperatively transport secure packet streams, transporting and correcting secure packet streams in a cooperative environment, and rendering the original stored or streaming data from a secure packet stream.

Establishing connections between computers behind NAT routers requires testing those routers for their specific method of operation. Routers are tested to determine if they are "Open", "Multi", or "Closed", this information being used to determine how the two might form a direct connection.

In one embodiment of the invention, transport of secure stream packets is accomplished through UDP frames, a stateless protocol well suited to real-time transport over the Internet. Since UDP frames are unordered and are not guaranteed to arrive, a further aspect of the invention is the reordering, reassembly, and correction technique for these packets.

DESCRIPTION OF THE DRAWINGS

Other objects, features and advantages of the present invention will become more fully apparent from the following detailed description of the preferred embodiment, the appended claims and the accompanying drawings in which:

FIG. 4 is a is a schematic diagram of a Prior Art computer system and FIG. 1B is a schematic of a data delivery system according to an embodiment of the invention with one server and eight computers connected in a network.

DETAILED DESCRIPTION OF THE INVENTION

Figure 1A:
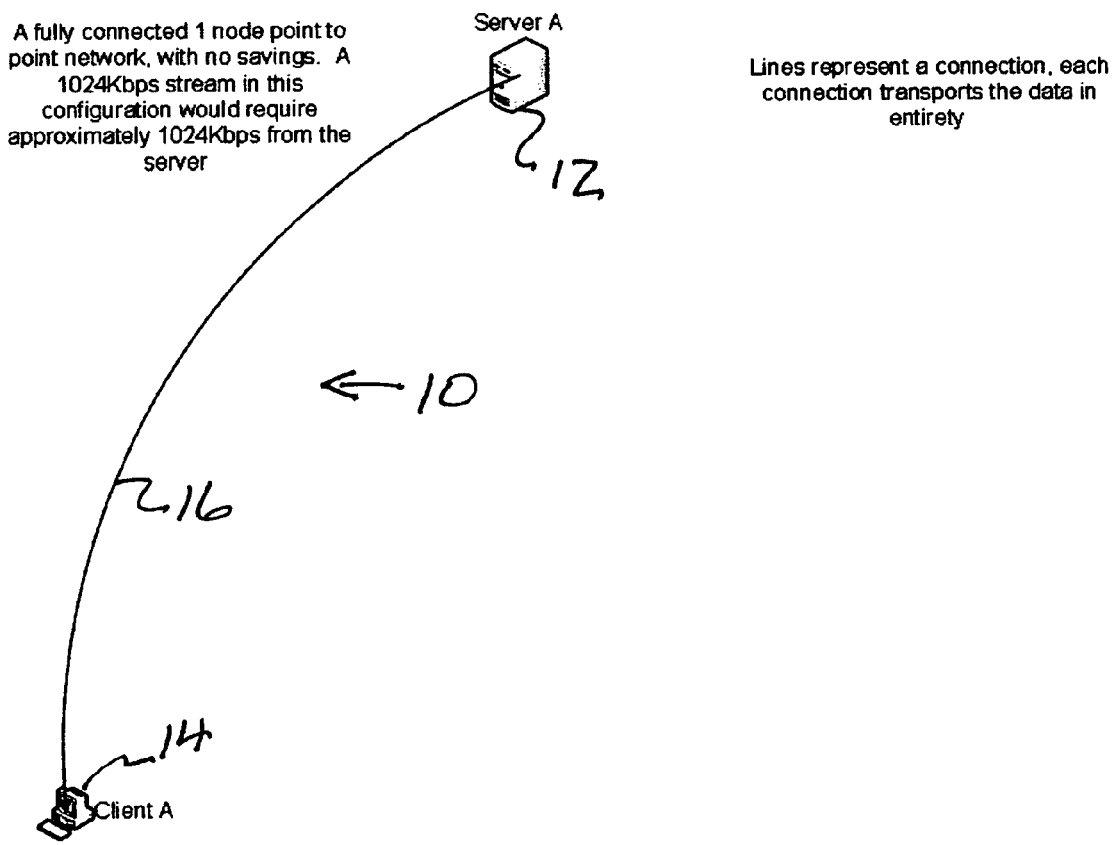
FIG. 1A is a schematic diagram of a Prior Art computer system and FIG. 1B is a schematic of a data delivery system according to an embodiment of the invention with one server and one computer connected in a network.

An embodiment of the present invention is set forth herein. By way of example only and not by limitation, the data delivery system and method of the present invention according to one embodiment is best understood by the following description.

To begin with, in the instance where a computer system includes NAT routers the initial issue is to determine the NAT router characteristics. NAT routers must maintain a listing of the external ports each internal computer is using to communicate with the outside world, such that responses to that port can be forwarded to the appropriate port on the appropriate internal computer. The implementations of these port mappings vary and, as such, different methods must be used to establish a direct connection between two hosts behind NAT routers.

An "Open" NAT router is characterized by the use of a single external port per internal port and computer, as well as a lack of filtering based on prior communication. As such, any packet arriving on a mapped external port is forwarded to the appropriate internal port and computer, regardless of whether that computer has previously communicated with the sender of the packet. An "Open" router can be detected by sending a packet from a previously unknown computer to a previously mapped external port on the router. If the internal computer the external port maps to receives the packet, the router is deemed "Open".

In one aspect of the invention, a computer that is directly connected to the Internet is deemed "Open" as it would behave exactly the same as if it were behind an "Open" NAT router.

A "Multi" NAT router is differentiated from the "Open" NAT routers in that it filters incoming packets based on whether the internal computer has previously communicated with the sender of the packets. After the internal computer has communicated with an external one, the external computer's packets will not be filtered. A router known to not be open "Open" can be detected as "Multi" if a packet sent through a previous mapping to an unknown external host is sent from the same external port. A router is deemed "Closed" if it is not "Open" or "Multi".

A "Closed" NAT router uses a different external port for each external computer, and as such internal computers would require knowledge of the next external port to be opened in order for a connection to be established between two such routers.

Should two hosts behind "Closed" routers wish to communicate directly, they must guess the external port for the next mapping that each router will make. This is accomplished by creating two new mappings each, determining the difference in the ports opened by each, and attempting to establish a connection to the expected next port, assuming that ports are created sequentially.

According to one aspect of the invention, after an initial set of ten port allocations, connections and allocations are traded off so that available external ports are not exhausted before a connection is achieved. Thus, by these methods, Applicant's invention is enabled to connect computers on a network to a server whether or not the computers have NAT routers or the like.

As used herein, the term "server" and "computer" distinguish between the system that has the original data to be transferred, the server, and the devices to which the data is to be sent, the computers. Obviously, the server and the computers may be the same mechanical device, CPU, PDA, cell phone or the like or any data storage, manipulation and transfer device now known or hereafter developed. The term "peer computers" identifies computers that are connected or connectable with each other and that are compatible in that they can transfer data between them. Likewise, as used herein, the term "data" is used to identify information collected on the server that is to be sent and/or distributed to computers connected on a network. The data may be numbers, words, images, sounds or any other form of data now known or hereafter developed. As set forth more fully in the application hereafter, the data may be defined as the entire group of information in the form of a complete "data file" or "data stream" and portions of the data file called "data packets" or just "packets". A particular or specific packet is called a "mask". Still further, as used herein, the term "network" includes internal networks, external networks, the World Wide Web, the Internet and the like and any network system now known or hereafter developed.

One aspect of the invention characterizes different types of packets according to whether missing such a packet would cause undesirable operation. Packets that must be reliably transported in order are sequenced, such that each packet contains a sequence, and said sequence increments by one for every packet sent until it reaches a configurable rollover, at which point it resets to zero.

Using such sequences, it is possible to reconstruct an ordered and complete set of packets. If the total data received in the form of packets do not contain a complete set of sequences, the missing sequences must be requested from the sending computer, the "server", to complete the set. One aspect of the invention bases such correction requests on the length of time a given sequence is missing, rather than a certain number of sequences or a certain amount of data. This allows the invention to adapt to poor networking conditions by utilizing more bandwidth, thus maintaining a consistent and configurable delivery delay.

A further embodiment of the invention utilizes private key encryption technology to produce a stream of authenticated packets from a data file or data stream. Each packet is tagged with an RSA encrypted hash of its contents known as a signature. This signature has the desirable property of being computationally infeasible to generate except at the server, but can be easily verified at each peer computer on the network, such that peers cannot modify then forward any portion of the packet stream to other peers. In an embodiment of the invention, peers verify each packet upon receipt and discard packets that do not verify properly, thus ensuring that they receive only valid data.

In one embodiment of the invention, individual data streams are designated by a globally unique identifier, which is a 128 bit binary value.

According to the invention, a plurality of peers must be organized into a coherent structure that supports the distribution of data streams amongst themselves while utilizing the fewest source resources possible. In accordance with Applicant's invention, each peer computer that wishes to receive a given data stream is assigned a particular portion of the packets known as a mask. A mask is composed of 32 bits, each of which designate a specific sequence modulus. As such, a full mask contains 32 set bits, and refers to every packet in the stream, whereas a mask with only the first bit set refers to every $32^{nd}$ packet in the stream.

Applicant's invention also included descriptors. Descriptors consist of a globally unique identifier, an address and port, and an available mask. Descriptors for a given data stream are randomly spread by the server amongst all the peers receiving the data stream in the form of packets, such that they can maintain a listing of other peers and which peer is receiving which mask. Descriptors are discarded by peers after a configurable period of disuse in order to maintain an accurate listing.

Each peer computer is assigned a mask which represents the portion of the total data it is responsible for sharing to other peers in the form of packets. According to the invention, peers only receive their assigned mask from the server and attempt to correct any missing packets immediately so they can be forwarded to other peers with the least latency possible. When a packet matching its mask is received by a peer, that packet is forwarded to as many connected peers as possible, within bandwidth constraints.

Thus, according to the invention, peers receive data from both the source, the server, and other peers, and can expect the data received from peers to be delayed more than the data received from the source. As such, according to the invention, peers wait a configurable amount of time before requesting packets from the source that peers failed to send, while they immediately request packets missed from the source itself. Importantly, however, all missing packets are ultimately requested from the source in a preferred embodiment of the invention, since peers sending at or near their maximum bandwidth are likely to be unable to re-send any given packet. This two-tiered approach ensures that missing packets are replaced reliably without significantly varying the sending bandwidth of peers.

According to another aspect of the invention, periodically, peers examine what they are receiving from the source and peers and attempt to replace packets currently being received from the source with peers able to send that portion. Once a connection is established with a peer, a request mechanism determines whether that peer has enough upstream bandwidth to forward the mask it is receiving from the source. If it does have sufficient upstream bandwidth, it accepts the request and begins sending, at which point the receiving peer requests that the source no longer send that particular mask. This results in a net savings of bandwidth since the source no longer has to send that mask directly, but can rely on the sending peer to forward it.

Further, if any given peer stops forwarding its mask for any reason, a packet correction mechanism requests that mask from the source until the receiving peer determines the sending peer has disappeared, at which point it requests that the source start sending that mask again. After a configurable period of time, the system attempts to send the mask to a different sending peer for redistribution from the peer again and not the server.

After the packets are re-ordered and corrected as set forth above, they are recombined to form the original data stream or data file, which is then presented via the same technologies typically used to distribute it. Preferred embodiments of the invention utilize common download and streaming protocols such as ICY, MMS, and HTTP. Obviously, any presentation protocol now known or hereafter developed is suitable for the purposes of the present invention.

Referring now to the figures, FIG. 1A is a schematic diagram of a prior art computer system 10 including one server 12 and one computer 14 connected in a network 16. FIG. 1A illustrates a fully connected one node point to point network with no resource savings for server 12. That is, a 1024 Kbps stream in this configuration would require approximately 1024 Kbps from server 12.

Figure 1B:
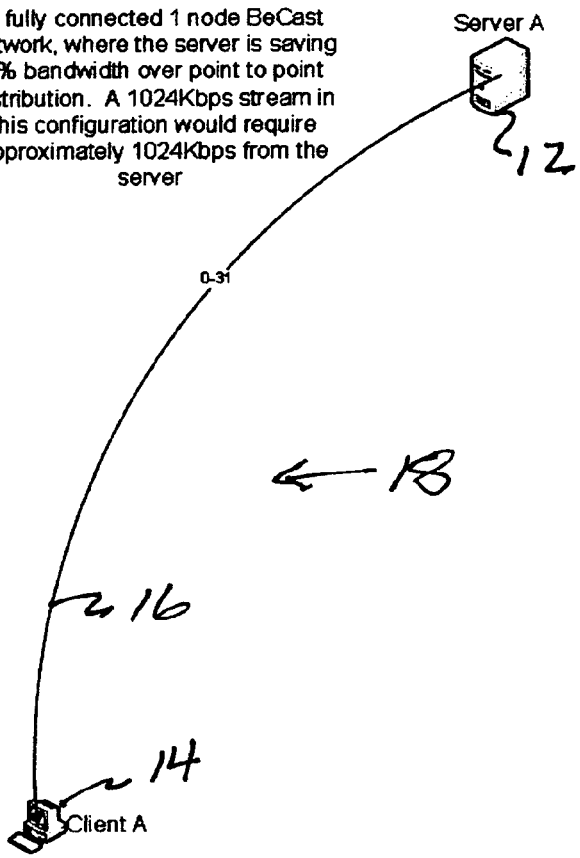

Likewise, FIG. 1B illustrates Applicant's data delivery system 18, with one server 12 and one computer 14 connected in a network 16. Here too, a fully connected one node point to point network saves zero bandwidth for server 12. That is, a 1024 Kbps stream in this configuration would in Applicant's invention also require approximately 1024 Kbps from server 12.

Figure 2A:
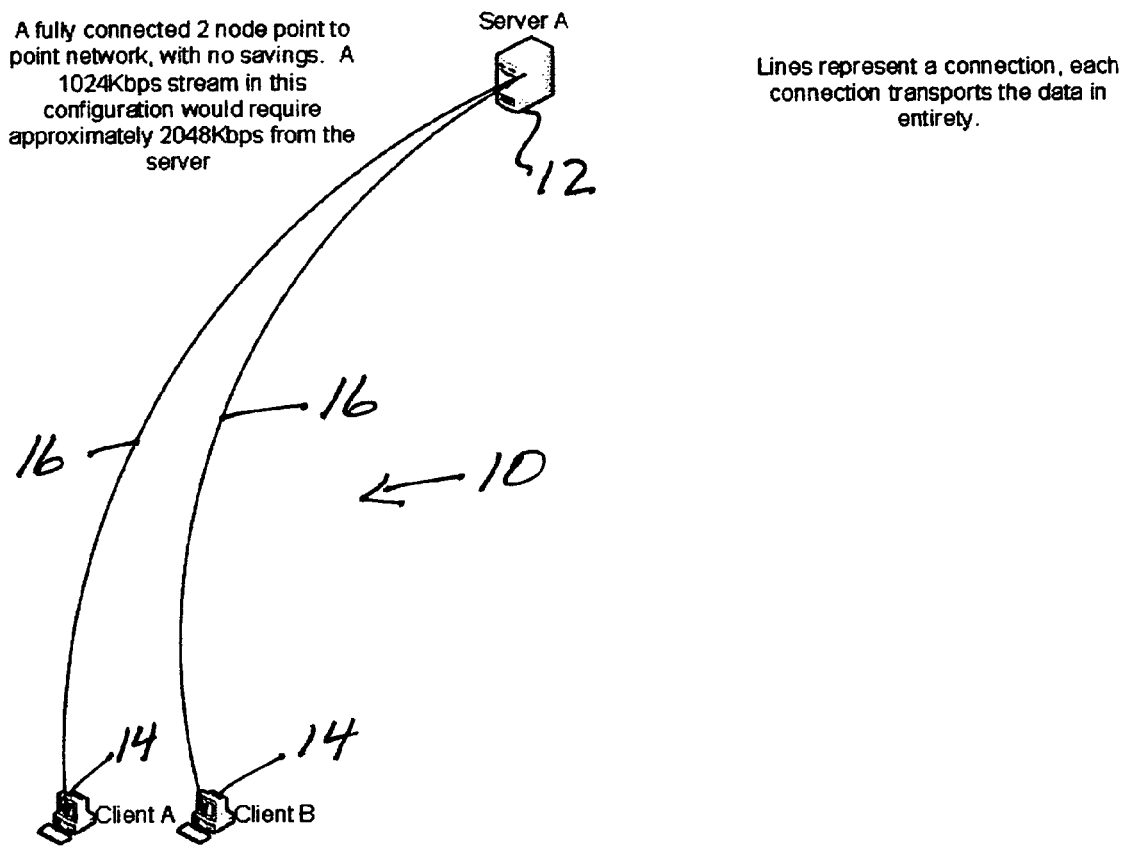
FIG. 2A is a schematic diagram of a Prior Art computer system and FIG. 2B is a schematic of a data delivery system according to an embodiment of the invention with one server and two computers connected in a network.

Referring now to FIG. 2A, a prior art computer system 10 includes one server 12 and two computers 14 connected in a network 16. This is a fully connected two node point to point network with no bandwidth savings for server 12. In fact, a 1024 Kbps stream in this configuration would require approximately twice as much bandwidth from server 12 or about 2048 Kbps.

Figure 2B:
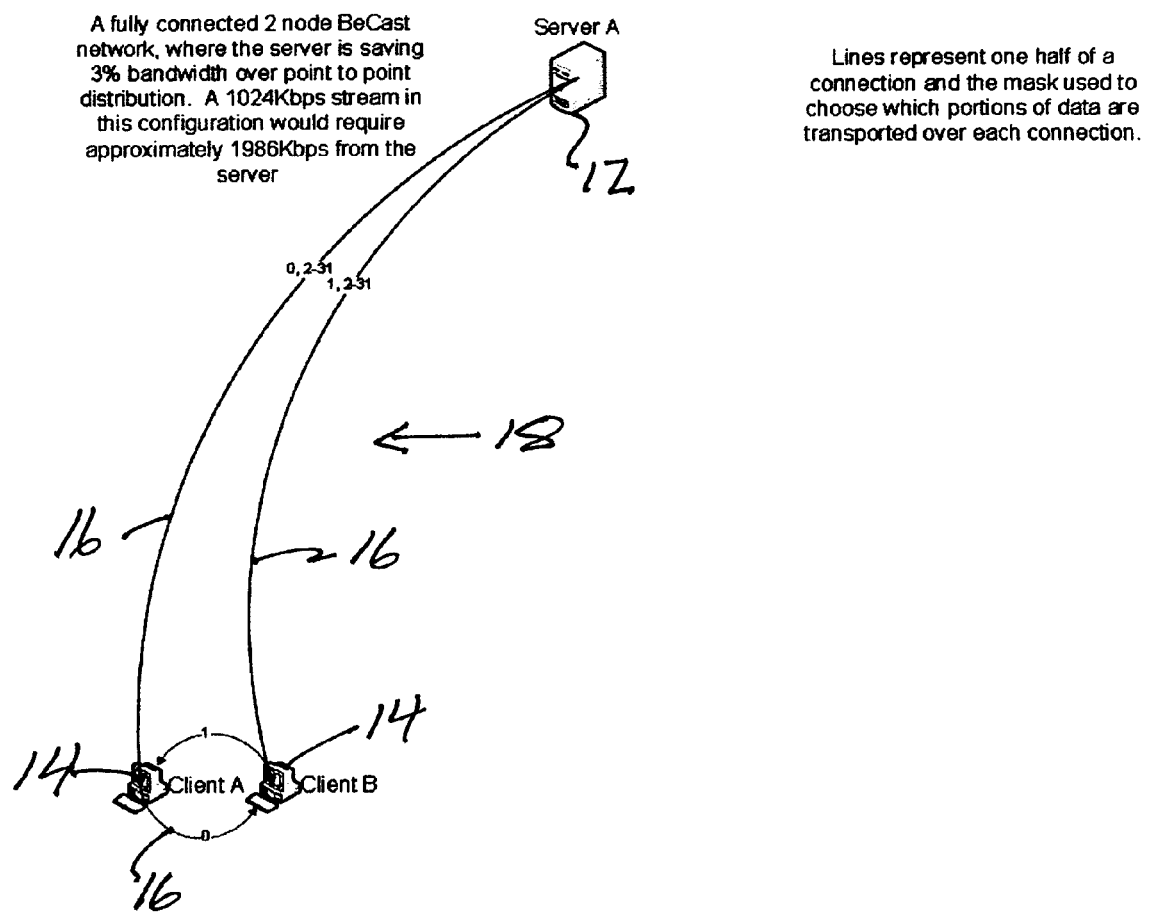

FIG. 2B however illustrates the beginning of the advantage of Applicant's invention in which its fully connected two node network saves about three percent bandwidth over point to point distribution. According to Applicant's invention, server 12 is connected to computer Client A and computer Client B, as was the prior art system. In Applicant's data delivery system 18, however, Client A receives bit 0 as a specific mask of the packet along with bits 2-31. Client B receives bit 1 as its specific mask and bits 2-31. Client A and Client B are peer computers and at that point Client A sends mask bit 0 to Client B and Client B sends mask bit 1 to Client A. As a result, both Client A and Client B have received the entire packet of data but server 12 has not had to send the entire packet. Thus, with just two computers 14 connected to the network, the server 12 of Applicant's data delivery system 18 saves three percent bandwidth over the prior art computer system 10. That is, a 1024 Kbps stream according to Applicant's invention would require only about 1986 Kbps from server 12.

Figure 3A:
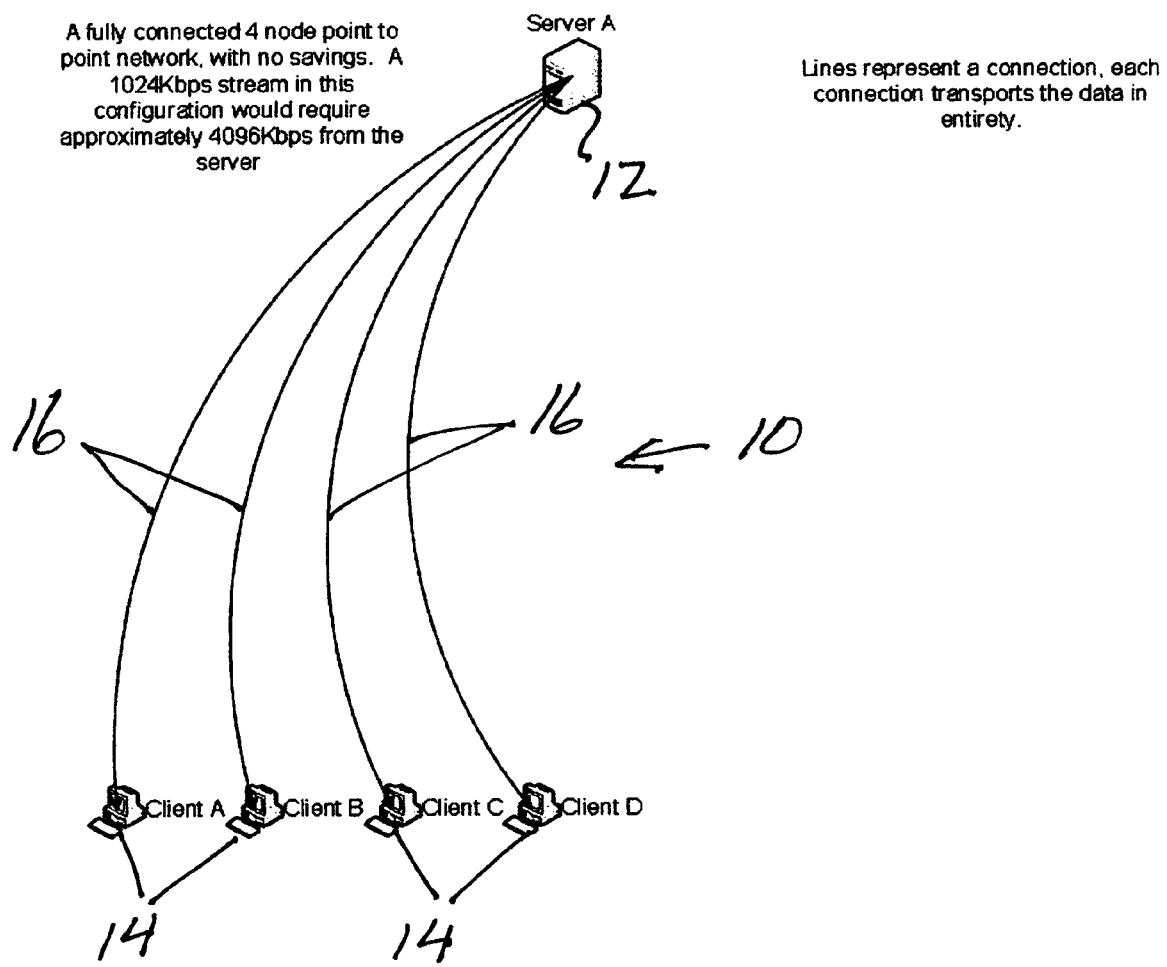
FIG. 3A is a is a schematic diagram of a Prior Art computer system and FIG. 3B is a schematic of a data delivery system according to an embodiment of the invention with one server and four computers connected in a network.

FIG. 3A shows that four computers 14 connected to server 12 according to the prior art result in no savings and a 1024 Kbps stream in this configuration would require about 4096 Kbps from the server 12. As is typical, the bigger the prior art computer system 10 the more demand on bandwidth resources.

Figure 3B:
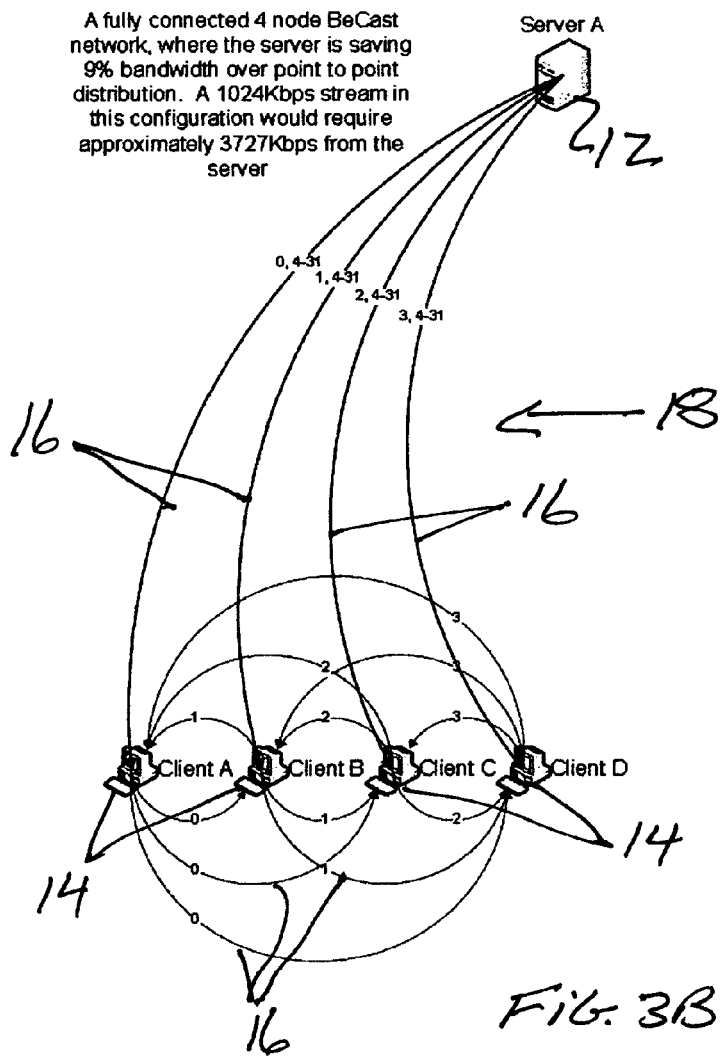

FIG. 3B shows that a similar four node network according to Applicant's invention, however, saves about nine percent bandwidth over the prior art in that a 1024 Kbps stream according to Applicant's data delivery system 18 would require only about 3727 Kbps from server 12. This is so because Client A is sent bit 0 and bits 4-31 of the packet, Client B is sent bit 1 and bits 4-31, Client C is sent bit 2 and bits 4-31 and Client D is sent bit 3 and bits 4-31. Thus server 12 sends each connected computer bits 4-31 but only sends the four other single bits, identified by masks, to one other computer 14 which reduces the bandwidth requirements as discussed.

Figure 4A:
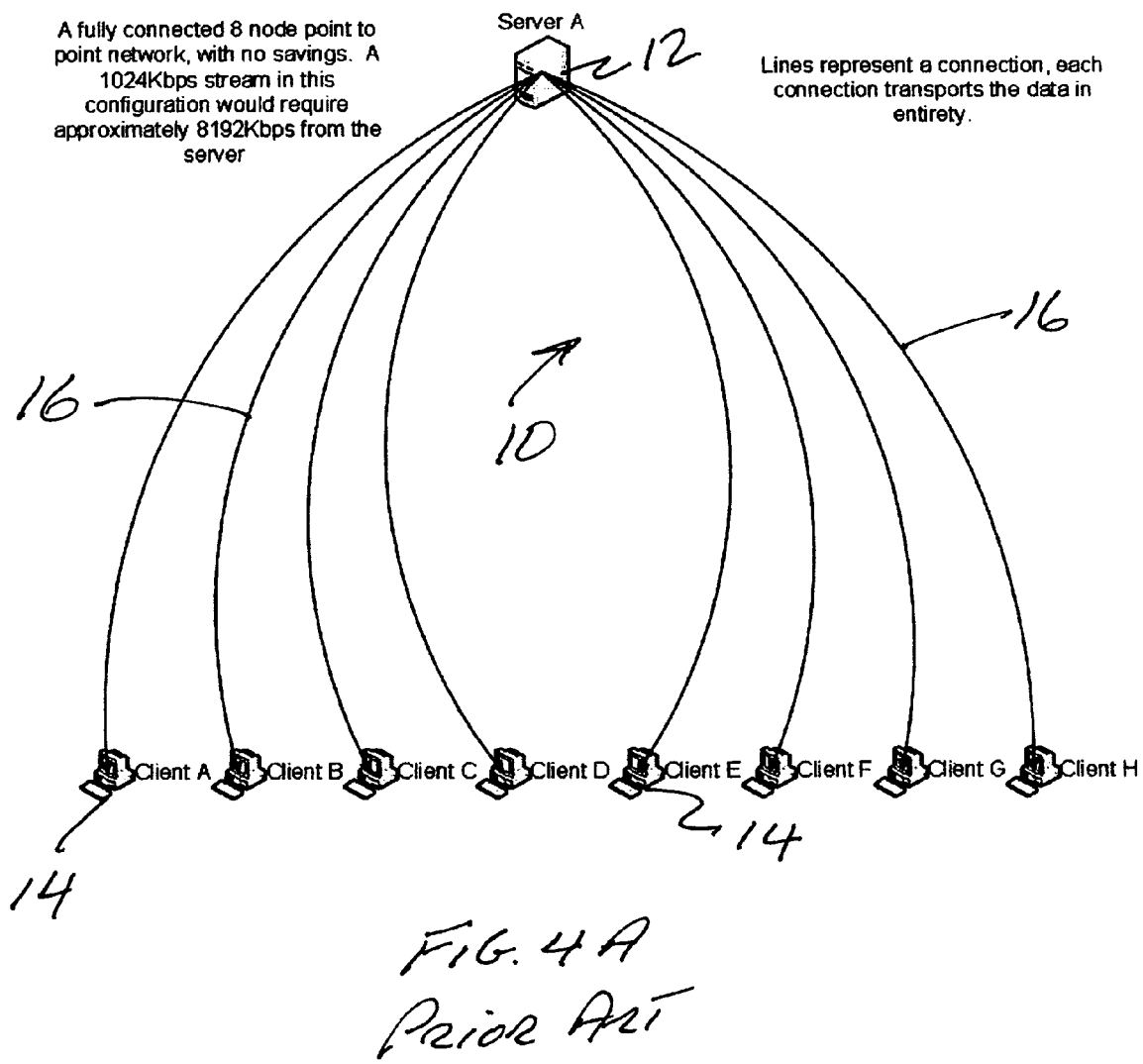
Figure 4B:
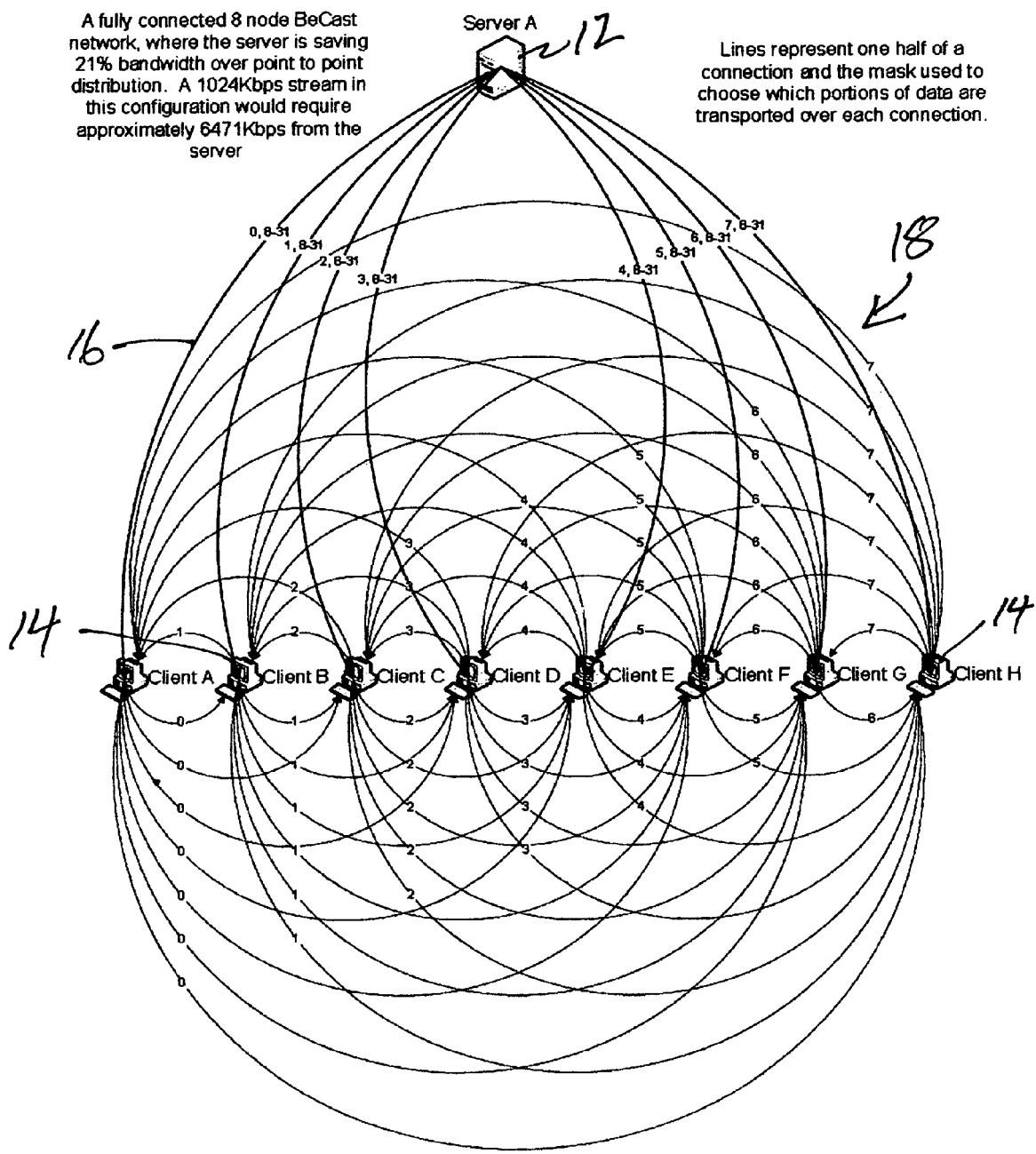

Similarly, FIG. 4A shows no savings and a 1024 Kbps stream in an eight node point to point system would increase demand to about 8192 Kbps from the server 12. At just eight peer computers 14 connected according to Applicant's invention, however, the server 12 is saving twenty-one percent bandwidth over the prior art. A 1024 Kbps stream in this configuration would require only about 6471 Kbps. Here, Client A receives as its mask bit 0 and remaining bits 8-31, Client B receives bit 1 and bits 8-31 and so forth. Thus, with only eight connected peer computers, over twenty percent of the prior art bandwidth requirements are saved.

As set forth above, once the number of peer computers receiving specific masks is sufficient to receive the entire packet, the server is at maximum reduction of bandwidth in that it is only required to send a single mask to each peer computer and the peer computers transfer their specific mask to all other peer computers. In that manner the entire data file is received and bandwidth is reduced significantly over prior art systems and methods. As shown, even when the sever is required to send additional portions of the packet to multiple peer computers, there are still measurable and significant reductions on bandwidth requirements. Thus, Applicant's data delivery system 18 is useful to small networks or to large, even global, networks.

The description of the present embodiments of the invention have been presented for purposes of illustration but are not intended to be exhaustive or to limit the invention to the form or systems disclosed. Many modifications and variations will be apparent to those of ordinary skill in the art. As such, while the present invention has been disclosed in connection with the preferred embodiment thereof, it should be understood that there may be other embodiments which fall within the spirit and scope of the invention as defined by the following claims.

What is claimed is:

1. A data delivery system comprising:
   a) a server, connected to a network, containing data in the form of a plurality of packets wherein each packet is identified by masks; and
   b) computers connected to said network wherein each of said computers that are identified by said server as peer computers, wherein the identification of peer computers includes identifying open, multi and closed computers using a NAT router, is assigned to receive a specific mask from said server, wherein the specific mask is from the plurality of masks and wherein each peer computer receives a specific mask that is different from the other specific masks received by any other peer computers and each peer computer delivers said received specific mask to all other peer computers such that in combination each peer computer receives one specific mask from said server and a remainder of said packet in the form of other specific masks from the other peer computers and, if there are fewer peer computers than masks, then the remainder of said packet is received from said server.

2. The apparatus of claim 1 wherein said masks are sequentially numbered.

3. The apparatus of claim 2 wherein said peer computers assemble said masks according to sequential numbers.

4. The apparatus of claim 2 further including a request mechanism whereby missing masks from the server are immediately requested from said server and wherein a configurable delay occurs prior to requesting said server to send missing masks sent to other peer computers.

5. The apparatus of claim 4 wherein said request mechanism further includes a periodic check of peer computer availability in order to assign further specific masks to additional peer computers so as to reduce the amount of data sent by said server.

6. The apparatus of claim 1 wherein the identification of peer computers includes identifying open, multi and closed computers using a NAT router.

7. A data delivery method comprising:
   a) connecting a server, containing data in the form of packets, to a network wherein
   each packet is divided into a plurality of masks;
   b) connecting computers to said network and identifying peer computers by said server wherein the identification of peer computers includes identifying open, multi and closed computers using a NAT router;
   c) assigning each of said computers that are identified by said server as peer computers to
   receive a specific mask from said server, wherein the specific mask is from the plurality of masks and wherein each peer computer receives a specific mask that is different from the other specific masks received by any other peer computers; and
   d) each peer computer delivering said received specific mask to all other peer computers such that in combination each peer computer receives one specific mask from said server and a remainder of said packet in the form of other specific masks from the other peer computers and, if there are fewer peer computers than masks, then the remainder of said packet is received from said server.

8. The method of claim 7 wherein said masks are sequentially numbered.

9. The method of claim 8 wherein said peer computers assemble said masks according to sequential numbers.

10. The method of claim 8 further including providing a request mechanism whereby missing masks from the server are immediately requested from said server and wherein a configurable delay occurs prior to requesting said server to send missing masks sent to other peer computers.

11. The method of claim 10 wherein said request mechanism further includes periodically checking peer computer availability in order to assign further specific masks to additional peer computers so as to reduce the amount of data sent by said server.

12. The method of claim 7 further including distributing a descriptor on said network wherein said descriptor includes a global identifier for a specific packet, an address and a port and an available mask.

13. The method of claim 7 wherein said packets include an authentication number such that packets without authentication numbers are rejected by said peer computers.

14. In a computer system including a server containing data connected with a network to other computers, computer code recorded on a computer readable medium for delivering data comprising:
   a) computer code for forming said data into packets and identifying said packets by masks;
   b) computer code for identifying computers connected to said network as peer computers
   and assigning each of said peer computers to receive a specific mask from said server and computer code for identifying open, multi and closed computers using a NAT router, wherein the specific mask is from the plurality of masks and wherein each peer computer receives a specific mask that is different from the other specific masks received by any other peer computers; and
   c) computer code for causing each peer computer to deliver said received specific mask to all other peer computers such that in combination each peer computer receives one specific mask from said server and a remainder of said packet in the form of other specific masks from the other peer computers and, if there are fewer peer computers than masks, then the remainder of said packet is received from said server.

15. The invention of claim 14 further including computer code for sequentially numbering said masks.

16. The invention of claim 15 further including computer code enabling said peer computers to assemble said masks according to sequential numbers.

17. The invention of claim 14 further including computer code for distributing a descriptor on said network wherein said descriptor includes a global identifier for a specific packet, an address and a port and an available mask.

18. The invention of claim 14 wherein said computer code for dividing said data into packets includes computer code for adding an authentication number such that packets without authentication numbers are rejected by said peer computers.

19. The invention of claim 14 further including computer code for a request mechanism whereby missing masks from the server are immediately requested from said server and wherein a configurable delay occurs prior to requesting said server to send missing masks sent to other peer computers.

20. The invention of claim 19 wherein said computer code for said request mechanism further includes computer code for periodically checking peer computer availability in order to assign further specific masks to additional peer computers so as to reduce the amount of data sent by said server.

* * * * *